UNITED STATES PATENT OFFICE.

CARLETON ELLIS, OF MONTCLAIR, NEW JERSEY, ASSIGNOR TO ELLIS-FOSTER COMPANY, A CORPORATION OF NEW JERSEY.

WEATHER-RESISTANT BRIQUET.

1,246,808.   Specification of Letters Patent.   Patented Nov. 13, 1917.

No Drawing.   Application filed July 5, 1917.   Serial No. 178,633.

*To all whom it may concern:*

Be it known that I, CARLETON ELLIS, a citizen of the United States, and a resident of Montclair, in the county of Essex and State of New Jersey, have invented certain new and useful Improvements in Weather-Resistant Briquets, of which the following is a specification.

This invention relates to briqueting coal, coal fragments or dust, culm, iron ore, blast furnace dust, flue dust, fiber, sand or other mineral matter, sawdust, or similar bulking material, employing as a binder, or as a component of the binder a solution of sulfate cellulose waste liquor solids. This may be obtained by diluting the concentrated liquor especially the product formed by drying to a solid pulverulent state in any suitable manner, as for example by atomization.

As a coagulating or precipitating agent or insolubilizing body I make use of a basic compound of magnesium preferably in a light finely-divided form. Hydrated lime prepared from dolomitic lime also may be used.

Taking coal fragments as an example of a bulking agent, this material is mixed with say ten per cent. of sulfite liquor of about 27–30° B. If dry sulfite liquor solids are used these may in some cases be mixed dry with the coal and afterward water added in sufficient amount to make a mass capable of being shaped into briquet form. Magnesium oxid is added to the extent of 2% (more or less) based on the weight of the coal. It may be mixed with the coal before incorporating the binder. An acid sulfite liquor having an acidity of 1 or 2% (calculated as sulfuric acid) for liquor of 27–30° B. is a suitably reactive body.

The mass quickly sets after briqueting and becomes quite resistant to water after a day or two. Heat may be used to accelerate the set.

Less than 2% of the light magnesia insolubilizing agent does not give reliable results for all purposes. Approximately 2% is preferably employed.

What I claim is:—

1. The process of making briquets which comprises incorporating a bulking agent, magnesium oxid and a binder comprising sulfite cellulose waste liquor solids and pressing the mass to the requisite shape.

2. A briquet comprising sulfite cellulose waste liquor solids, a basic compound of magnesium as a precipitant and a bulking agent.

CARLETON ELLIS.